(12) United States Patent
Fan

(10) Patent No.: US 9,810,831 B2
(45) Date of Patent: Nov. 7, 2017

(54) BACKLIGHT UNIT OF HIGH LIGHT COUPLING EFFICIENCY

(71) Applicant: Shenzhen China Star Optoelectronics Technology Co., Ltd., Guangdong (CN)

(72) Inventor: Yong Fan, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 172 days.

(21) Appl. No.: 14/768,371

(22) PCT Filed: Jun. 29, 2015

(86) PCT No.: PCT/CN2015/082692
§ 371 (c)(1),
(2) Date: Aug. 17, 2015

(87) PCT Pub. No.: WO2016/206127
PCT Pub. Date: Dec. 29, 2016

(65) Prior Publication Data
US 2017/0139117 A1 May 18, 2017

(30) Foreign Application Priority Data
Jun. 24, 2015 (CN) .......................... 2015 1 0355437

(51) Int. Cl.
*F21V 8/00* (2006.01)
(52) U.S. Cl.
CPC .......... *G02B 6/0085* (2013.01); *G02B 6/0068* (2013.01)

(58) Field of Classification Search
CPC ............................ G02B 6/0085; G02B 6/0068
See application file for complete search history.

(56) References Cited

U.S. PATENT DOCUMENTS 9,030,621 B2   5/2015  Kim et al.
9,158,059 B2  10/2015  Yu et al.
(Continued)

FOREIGN PATENT DOCUMENTS

CN    101071230    11/2007
CN    101876765    11/2010
(Continued)

OTHER PUBLICATIONS

International Search Report for PCT/CN2015/082692, Completed by the Chinese Patent Office on Mar. 2, 2016, 11 Pages.

*Primary Examiner* — Mary Ellen Bowman
(74) *Attorney, Agent, or Firm* — Brooks Kushman P.C.

(57) ABSTRACT

A backlight unit of high light coupling efficiency including a light guide plate, a first light source component and a second light source component disposed beside two neighboring side walls of the light guide plate, and a heat dissipation element that contacts a first substrate of the first light source component and a second substrate of the second light source component simultaneously and is disposed on a bottom of the light guide plate. The backlight unit of the present disclosure can effectively dissipate heat generated during the operation of the light source components, thereby avoiding the mura phenomenon caused by a change of a light coupling distance due to the expansion of the light guide plate because of overheating.

14 Claims, 1 Drawing Sheet

(56) References Cited

U.S. PATENT DOCUMENTS

2006/0146570 A1    7/2006  Park
2006/0262556 A1\*  11/2006  Zeng ..................... F21V 29/004
                                                                              362/600
2010/0277664 A1\*  11/2010  Kim ..................... G02B 6/0085
                                                                              349/58

FOREIGN PATENT DOCUMENTS

| CN | 102042533 | 5/2011 |
| CN | 102901054 | 1/2013 |
| CN | 103162169 | 6/2013 |
| CN | 103591512 | 2/2014 |
| CN | 103727467 | 4/2014 |
| CN | 104613384 | 5/2015 |

\* cited by examiner

BACKLIGHT UNIT OF HIGH LIGHT COUPLING EFFICIENCY

CROSS-REFERENCE TO RELATED APPLICATION

This application is the U.S. national phase of PCT Application No. PCT/CN2015/082692 filed on Jun. 29, 2015, which claims priority to CN Patent Application No. 201510355437.1 filed on Jun. 24, 2015, the disclosures of which are incorporated in their entirety by reference herein.

BACKGROUND OF THE INVENTION

1. Field of the Invention

The present disclosure relates to display technical field, and in particular, to a backlight unit of high light coupling efficiency.

2. The Related Arts

As a development of liquid crystal televisions (TVs) is tended to large size and high-definition 4K even 8K resolution technique, the number of pixel units of a liquid crystal display (LCD) panel is increased, the size and the aperture ratio of a pixel are decreased, and the transmittance of a LCD panel is also reduced.

In order to improve transmittance of a large-sized LCD panel, it needs to enhance backlight brightness. As for an edge type LCD panel, if it merely adopts unilateral incident light, it cannot get rid of limits of flow brightness of a single lamp and poor heat dissipation effect of a conventional Light-Emitting Diode (LED). Plus, transmittance of a large-sized high definition LCD panel is relatively low, thus, a designed brightness of a single long side cannot achieve a set brightness. Thus, there is a method for enhancing a backlight brightness in the prior art. In specific, both short and long sides of a light guide plate are provided with edge type light sources simultaneously. However, the light guide plate having this structure cannot dissipate heat uniformly, which is easily heated and expanded due to moisture absorption to cause mura (i.e., various shadow phenomenon caused by nonuniform brightness of a display). Meanwhile, expansion of the light guide plate may also cause the LED to crack. In order to avoid those phenomena, designers generally reduce risks of occurrence of warping and hitting lamp by increasing a light coupling distance between the LED and the light guide plate. However, due to the increase of the light coupling distance, a light coupling efficiency of the light incident into the light guide plate is greatly decreased, especially, in the types of the devices that require for a narrow bezel design, in order to avoid edge light leakage, it is generally to add a material with low reflectivity over a light coupling region to reduce a risk of light leakage, so that the light coupling efficiency is further reduced.

SUMMARY

Due to the disadvantages existing in the prior art, the present disclosure provides a blacklight unit with uniform heat dissipation and high light coupling efficiency.

In order to achieve the above purpose, the present application adopts the following technical solution:

A backlight unit of high light coupling efficiency includes a light guide plate, a first light source component and a second light source component disposed beside two neighboring side walls of the light guide plate, and a heat dissipation element that contacts a first substrate of the first light source component and a second substrate of the second light source component simultaneously and is disposed on a bottom of the light guide plate.

Space retainers are disposed between the first substrate and the light guide plate, and the second substrate and the light guide plate.

The space retainers are elastic members.

The heat dissipation element includes a first portion contacting the first substrate, a second portion contacting the second substrate, and a third portion simultaneously contacting the first and second substrates, wherein a width of the third portion is greater than those of the first portion and the second portion.

A plurality of heat dissipation grooves is disposed in a back of the heat dissipation element.

The heat dissipation grooves are parallel to each other, and parallel to a diagonal line of the light guide plate.

The heat dissipation grooves have greatest density in the third portion.

The backlight unit of the present disclosure is provided with edge type light source components beside two neighboring side walls of the light guide plate, and a heat dissipation element for dissipating heat of the edge type light source components, which may effectively dissipate heat generated during the operation of the light source components, thereby avoiding the mura phenomenon caused by a change of a light coupling distance due to the expansion of the light guide plate because of overheating. Meanwhile, space retainers are disposed between the light guide plate and the respective light source components, which may effectively prevent the light guide plate from being expanded due to overheating to crack up the LED.

DETAILED DESCRIPTION OF THE PREFERRED EMBODIMENTS

In order for a clearer purpose, technical solution and the advantage of the present disclosure, the present disclosure will be explained in details by using exemplary embodiments in conjunction with the figures. It should be understood that the exemplary embodiments described here are merely used to explain the present disclosure rather than limiting.

Embodiment 1

Figure 1:
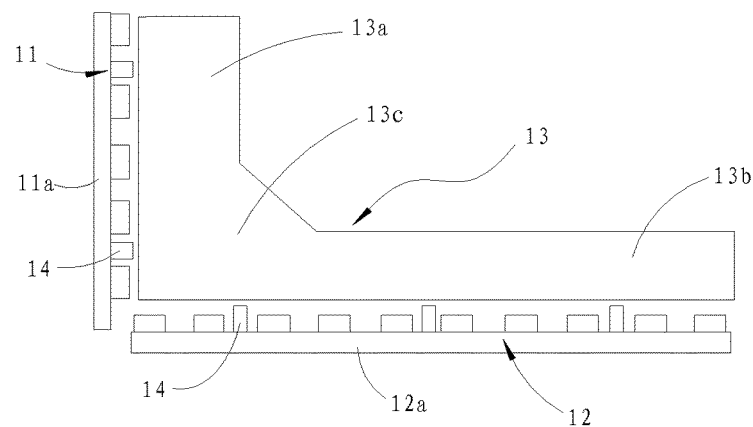
FIG. 1 is a schematic diagram of a structure of a backlight unit according to Embodiment 1 of the present disclosure.
Figure 2:
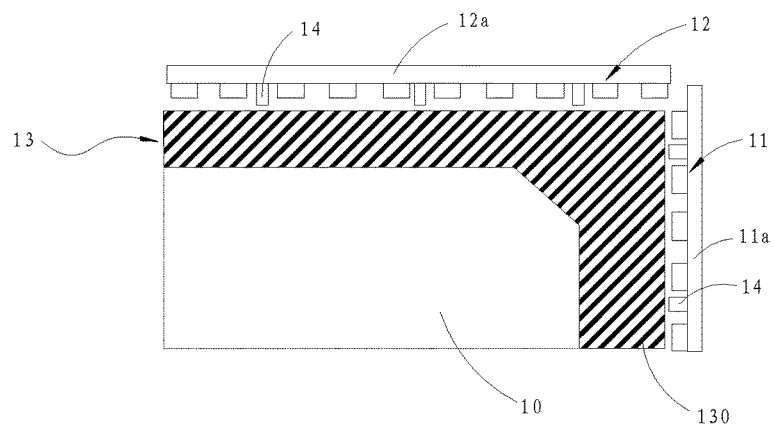
FIG. 2 is a schematic diagram of a structure in the other direction of a backlight unit according to Embodiment 1 of the present disclosure.

By referring to FIGS. 1 and 2, the present disclosure provides a backlight unit of high light coupling efficiency including a light guide plate 10, a first light source component 11, a second light source component 12, and a heat dissipation element 13. The first and second light source components 11 and 12 are respectively disposed beside two neighboring side walls of the light guide plate 10, and each of the first and second light source components 11 and 12 consists of a substrate and LED lamp beads. The heat dissipation element 13 is a plate-like structure, contacts a first substrate 11a of the first light source component 11 and a second substrate 12a of the second light source component 12 simultaneously, and is disposed on a bottom of the light guide plate 10, for conducting heat generated during the operations of the first and second light source components 11 and 12 simultaneously, thereby preventing the LED lamp beads from being overheated to be damaged and reducing the heat dispersed to the light guide plate 10.

In order to prevent the light guide plate 10 from expanding such as when it becomes moist, space retainers 14 are respectively disposed between the first substrate 11a and the light guide plate 10, the second substrate 12a and the light guide plate 10. The space retainers 14 may be elastic members such as silicone, rubber or the like, so that even if the light guide plate 10 expands, the LED lamp beads of the first and second light source components 11 and 12 may be kept from the light guide plate 10 at a proper light coupling distance. Hence, light coupling distances between the first and second light source components 11 and 12 and the light guide plate 10 may be set very short to further enhance light coupling efficiency.

In addition, the heat dissipation element 13 includes a first portion 13a contacting the first substrate 11a, a second portion 13b contacting the second substrate 12a, and a third portion 13c simultaneously contacting the first and second substrates 11a and 12a. In the present embodiment, the first portion 13a and the second portion 13b are in strips, and the third portion 13c is a middle transition portion for connecting the first portion 13a and the second portion 13b. Since the third portion 13c conducts heat from the first substrate 11a and the second substrate 12a simultaneously, the third portion 13c suffers from heat concentratedly. If it is not properly designed, concentrate heating of this portion will be caused. Thus, when the temperature is too high, a phenomenon of light leakage at corners of a display may be caused. The third portion 13c has a greater width than the first portion 13a and the second portion 13b. In specific, the first portion 13a and the second portion 13b are perpendicular to each other, and the third portion 13c is a connection plate between the first portion 13a and the second portion 13b.

In order to further enhance heat dissipation capability of the third portion 13c to enable the respective portions to have the same heating conditions and temperatures of the LED lamp beads at different portions to be approximate to each other, a plurality of heat dissipation grooves 130 are disposed in a back of the heat dissipation element 13. In the present embodiment, the plurality of heat dissipation grooves 130 are parallel to each other, and parallel to a diagonal line of the light guide plate 10, so as to facilitate the first substrate 11a and the second substrate 12a to radiate heat toward a side far away from the light guide plate 10.

Embodiment 2

Figure 3:
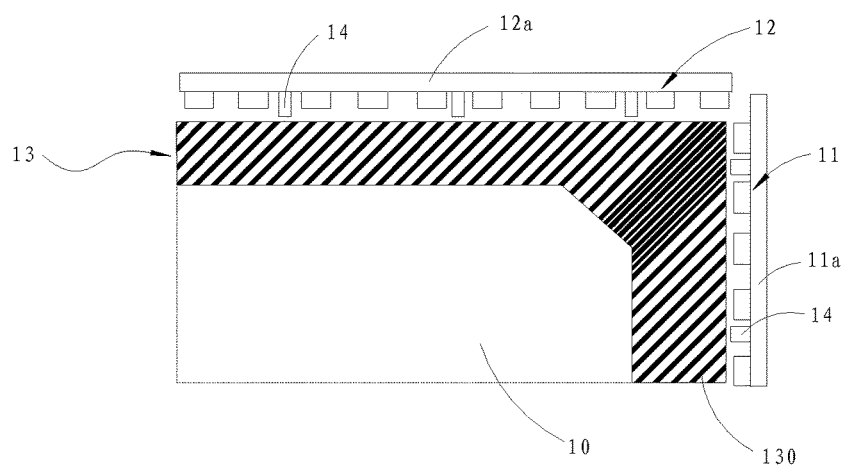
FIG. 3 is a schematic diagram of a structure of a backlight unit according to Embodiment 2 of the present disclosure.

As shown in FIG. 3, it is different from Embodiment 1 that the heat dissipation grooves 130 of the present embodiment are set to have greatest density in the third portion 13c of the heat dissipation element 13, so that the respective portions may have the same heating conditions and temperatures of the LED lamp beads at different portions may be approximate to each other, which is beneficial to improve a service life of the backlight and enhance uniformity of the backlight brightness after a long-term use of a display device.

It should be understood that in other embodiments, heat dissipation fins etc. may be added to the back of the third portion 13c of the heat dissipation element 13 to resolve the problem of concentrate heat dissipation at this portion.

The backlight unit of the present disclosure is provided with edge type light source components beside two neighboring side walls of the light guide plate, and provided with a heat dissipation element for dissipating heat of the edge type light source components, which may effectively dissipate heat generated during the operation of the light source components, thereby avoiding the mura phenomenon caused by a change of a light coupling distance due to the expansion of the light guide plate because of overheating. Meanwhile, space retainers are disposed between the light guide plate and the respective light source components, which may effectively prevent the light guide plate from being expanded due to overheating to crack up the LED. Furthermore, the heat dissipation capabilities of the respective portions of the heat dissipation element are reasonably designed so that the third portion may have higher heat dissipation capability than other portions, which better ensures the temperatures of the respective portions to be consistent with each other, thereby effectively avoiding a change in light coupling distance caused by local expansion and an occurrence of a low light coupling efficiency.

The above statements are only the specific embodiments of the present application. It will be apparent to those ordinary skilled in the art that several improvements and polish can be made without departing from the principle of the present application, and those improvements and polish should be also considered as the protection scope of the present application.

What is claimed is:

1. A backlight unit of high light coupling efficiency, comprising:
    a light guide plate;
    a first light source component and a second light source component, each component disposed along one of a pair of neighboring side walls of the light guide plate, wherein the side walls extend perpendicular to one another and join about a plurality of points to define a corner; and
    a heat dissipation element including a first portion contacting a first substrate of the first light source component, a second portion contacting a second substrate of the second light source component, and a third portion joining together the first and second portions substantially about the corner and contacting the first and second substrates, wherein a width of the third portion is greater than respective widths of the first and second portions, and wherein the heat dissipation element is disposed to contact a bottom of the light guide plate.

2. The backlight unit of high light coupling efficiency of claim 1, wherein space retainers are disposed between the first substrate and the light guide plate, and the second substrate and the light guide plate.

3. The backlight unit of high light coupling efficiency of claim 2, wherein the space retainers define one of silicone and rubber material.

4. The backlight unit of high light coupling efficiency of claim 1, wherein a plurality of heat dissipation grooves are disposed in a back of the heat dissipation element.

5. The backlight unit of high light coupling efficiency of claim 4, wherein the heat dissipation grooves are parallel to each other, and further parallel about a diagonal line connecting opposing corners of the light guide plate.

6. The backlight unit of high light coupling efficiency of claim 4, wherein the heat dissipation grooves have greatest density in the third portion.

7. The backlight unit of high light coupling efficiency of claim 2, wherein the heat dissipation element comprises a first portion contacting the first substrate, a second portion contacting the second substrate, and a third portion simultaneously contacting the first and second substrates, wherein a width of the third portion is greater than those of the first portion and the second portion.

8. The backlight unit of high light coupling efficiency of claim 7, wherein a plurality of heat dissipation grooves are disposed in a back of the heat dissipation element.

9. The backlight unit of high light coupling efficiency of claim 8, wherein the heat dissipation grooves is parallel to each other, and parallel to a diagonal line of the light guide plate.

10. The backlight unit of high light coupling efficiency of claim 8, wherein the heat dissipation grooves have greatest density in the third portion.

11. The backlight unit of high light coupling efficiency of claim 3, wherein the heat dissipation element comprises a first portion contacting the first substrate, a second portion contacting the second substrate, and a third portion simultaneously contacting the first and second substrates, wherein a width of the third portion is greater than those of the first portion and the second portion.

12. The backlight unit of high light coupling efficiency of claim 11, wherein a plurality of heat dissipation grooves are disposed in a back of the heat dissipation element.

13. The backlight unit of high light coupling efficiency of claim 12, wherein the heat dissipation grooves is parallel to each other, and parallel to a diagonal line of the light guide plate.

14. The backlight unit of high light coupling efficiency of claim 12, wherein the heat dissipation grooves have greatest density in the third portion.

\* \* \* \* \*